3,006,723
PROCESS FOR THE SEPARATION OF ALUMINUM FROM SILICON IN ALUMINUM SILICATE ORES
Frederick D. Loomis, Philadelphia, Pa., assignor to Pennsalt Chemicals Corporation, Philadelphia, Pa., a corporation of Pennsylvania
No Drawing. Filed Mar. 20, 1959, Ser. No. 800,642
7 Claims. (Cl. 23—88)

This invention relates to a process for making high silica aluminum ores containing aluminum silicate available for use in the Hall-Heroult process for the electrolytic production of aluminum. More specifically, the invention is directed to processes for the separation of aluminum from silicon as they occur in a high silica aluminum ore containing aluminum silicate comprising reacting the said ore with a metal fluoride in the presence of a reducing agent and chlorine at high temperature to produce aluminum fluoride and silicon tetrafluoride.

Bauxite is the ore generally used for the production of alumina which in turn is used in the production of aluminum electrolytically in the Hall-Heroult process. The Bayer process is the most generally used procedure for the refining of bauxite to produce alumina. In the Bayer process the silicate content of the bauxite is most important, for any reactive silica combines with alumina during the digestion with caustic soda and is carried into the red mud as an insoluble sodium aluminum silicate. About 1 pound of alumina and 1 pound of soda are lost for each pound of silicate in the bauxite and these losses have prevented the use of alumina ores containing large amounts of silicates in the Bayer process.

A variety of processes has been proposed for extracting alumina from high silica bauxite, clay, and kyanite and other high silica alumina ores containing aluminum silicates. For example, alumina may be extracted from various aluminum bearing ores by acids, such as sulfuric or acid sulfates, hydrochloric, hydrofluoric and nitric acids. These processes present the difficult chemical problem of separating iron from aluminum and have the further disadvantage of requiring acid-proof equipment for the processes. Today none of these processes for the conversion of a high silica aluminum ore containing aluminum silicate has proved commercial except under special circumstances. Thus, the cost of separating silica from alumina has prevented the use of clays or other alumina ores bearing aluminum silicates from competing with bauxite as the cheapest raw material available for the supply of alumina.

I have now discovered a process which efficiently separates silicon from aluminum in ores containing substantial amounts of both. My process for the separation may be represented by the following chemical equations. The first step of my process is a dehydration step in which any chemically or physically bound water is removed by the application of heat. Using kaolin as an example of a high silica aluminum ore containing aluminum silicate, a high temperature is required in order to remove the water. Thus, the kaolin is dewatered at temperatures ranging between at least 400° C. and up to about 950° C. Equation 1 below is illustrative of the reaction.

(1) $Al_2O_3 \cdot 2SiO_2 \cdot 2H_2O$ (kaolin) $\xrightarrow{600° C.}$ $Al_2O_3 \cdot 2SiO_2 + 2H_2O$ Of course, if the ore is already in an anhydrous condition, the portion of the process described above would be unnecessary.

Following the elimination of the water the high silica aluminum ore containing aluminum silicate is then reacted with a metal fluoride in the presence of chlorine and a reducing agent such as carbon or carbon monoxide at high temperature to produce a residue of metal chloride and aluminum fluoride while silicon tetrafluoride is removed as a volatile gas. This reaction may be represented by Equation 2 below using carbon as the reducing agent and where Me represents a metal:

(2) $7MeF_2 + Al_2O_3 \cdot 2SiO_2 + 7/2C + 7Cl_2 \xrightarrow{700° C.} 7MeCl_2 + 2AlF_3 + 2SiF_4\uparrow + 7/2CO_2\uparrow$ Some CO may also be present.

The separation of the metal chloride from the aluminum fluoride is readily effected by water in which the metal chloride is readily soluble whereas the aluminum fluoride is insoluble. This leaching action is represented by Equation 3 below:

(3) Me chloride + aluminum fluoride + water → aqueous Me chloride + aluminum fluoride where Me represents a metal.

The insoluble aluminum fluoride is separated from the aqueous solution of the metal fluoride by means which are well known in the art, such as by centrifugation or filtration.

One of the unique features of my process is that the silica values are recoverable in a usable form by recovering the silicon tetrafluoride by means which are well known in the art. For example, passage through water will yield fluosilicic acid as indicated by Equation 4 below:

(4)   $3SiF_4 + 3H_2O \rightarrow 2H_2SiF_6 + SiO_2 \cdot H_2O$

The aluminum fluoride which remains after the aqueous extraction to remove the soluble chloride is dried to remove any water, after which it can be introduced to the Hall-Heroult electrolytic cell. It is of course appreciated in the art that fluorine is necessary in the Hall-Heroult process and can be provided by the introduction of cryolite or by the introduction of aluminum fluoride.

If it is not desired to use the aluminum fluoride obtained in the Hall-Heroult cell, as indicated above, it may be decomposed by steam to produce alumina and hydrofluoric acid. Thus, the alumina produced can be used directly in the Hall-Heroult cell, and the hydrofluoric acid can be used for other purposes. This reaction may be represented by Equation 5 below:

(5)       $2AlF_3 + 3H_2O \rightarrow Al_2O_3 + 6HF$

Examples of high silica aluminum ore containing aluminum silicate which have heretofore been unavailable as sources of aluminum in the Bayer process for the production of alumina are high silica-containing bauxites, kyanites and clays. As a preparation for use in my process the ores must be ground to a fine particle size in order that there may be intimate contact with the other reactants, generally a particle size of everything through 100 mesh is adequate, while a finer material with the majority through 325 mesh is preferred.

For the first part of the process, in which water is removed from the ores by heating, the ore may be introduced to a rotary kiln or other type of oven in which the ore can be heated to a high temperature. A temperature of at least 400° C. and up to 950° C. is satisfactory. Generally, no higher temperature is needed than is necessary to remove the chemically and physically bound waters which may be present in the particular ore. For kaolin, a temperature of 600° C. was adequate.

The dehydration reaction described above may be performed in a separate apparatus, or it may be carried out in an apparatus which can be used both for the dehydration operation and for the reaction of the aluminum silicate ore with the metal fluoride, chlorine and reducing agent represented by Equation 2 above. In the situation where both the dehydration and the chemical reaction are performed in the same apparatus, the dehydration operation is performed first followed by the chemical reaction. In the situation where both reactions are accomplished in the same vessel the aluminum silicate ore may be added separately and dehydrated or the aluminum silicate ore may be mixed with the metal fluoride and reducing agent such as carbon prior to its dehydration. The dehydration will have no effect on these materials. After the dehydration, the temperature is raised so that the mixture of the aluminum silicate ore, metal fluoride and reducing agent such as carbon is at a temperature of about 700° C. at which time chlorine is introduced. A temperature of at least 600° C. is needed to initiate the reaction. This temperature will vary somewhat depending on the particular metal fluoride and the particular aluminum silicate ore used. A temperature high enough to facilitate the reaction is required. For kaolin and calcium fluoride a reaction temperature of about 700° C. is adequate. Temperatures higher than the reaction temperature are also feasible in the operation of the process and temperatures up to about 950° C. may be used. The apparatus required for this reaction may conveniently be of steel shell construction lined with alumina brick and means must be provided for directing the effluent gases containing the silicon tetrafluoride and other gases such as carbon dioxide to some system where the fluorine may be recovered, as for example by solution in water with the formation of fluosilicic acid.

The metal fluorides useful in my process are the metal fluorides which form water-soluble chlorides which can be extracted from the reaction residue and thus provide a means of separation of the metal from the aluminum fluoride. Other important considerations are the availability of the fluoride and the possible contamination of the aluminum in the Hall-Heroult reduction cell. The alkali metal fluorides and the alkaline earth metal fluorides are quite satisfactory in my process. Metal fluorides such as iron fluoride, chromium fluoride and lead fluoride would contaminate the aluminum reduction cell in addition to being too expensive and thus are not used in my process.

The metal fluoride most useful in my process is calcium fluoride because of its great abundance. However, the other metal fluorides such as strontium, barium, lithium, sodium and potassium are also useful. Fluorspar is a convenient source when calcium fluoride is used.

Carbon is the preferred reducing agent for use in my process, but other reducing agents, for example, carbon monoxide can be used. The carbon may be in the form of activated carbon, or it may be powdered coal. A samll particle size in the same order as the metal fluoride is preferred.

It is also necessary in my reaction that the solid reactants, the metal fluoride, the aluminum silicate ore and the carbon be intimately mixed so that good contact of all of the three reactants may be had when the chlorine is introduced. A convenient way for obtaining this intimate mixture is for the reaction to take place in a rotating kiln. It will also be appreciated by those skilled in the art that the reaction may be batchwise or continuous.

The reaction may be tested for completion by checking the evolved gases for their fluorine content. When appreciable quantities of silicon tetrafluoride are no longer present, the reaction is essentially complete. In a continuous process the throughput of the materials is regulated so that sufficient time at the reaction temperature is obtained in the reactor in order to complete the reaction. In continuous operation countercurrent flow of the materials is desirable. Thus, in a rotary kiln, calcium fluoride, carbon and the aluminum silicate ore are introduced to the kiln at the same point. The chlorine is preferably introduced at the other end of the process so that the greatest chlorine concentration contacts the residue immediately before it leaves the kiln.

In the operation of my process it is important that sufficient metal fluoride be present to convert the aluminum in the ore to aluminum fluoride and the silicon present in the ore to silicon tetrafluoride. Similarly, there must be sufficient reducing agent such as carbon present in the mixture to convert the oxygen from the alumina and the silicon dioxide to carbon dioxide. The amount of chlorine that must be introduced to the reaction is that amount required to convert the metal fluoride to the chloride. It will of course be apparent to those skilled in the art that amounts less than those indicated above may be used with incomplete reaction while quantities in excess of those indicated above may be used in which case the reactants will proceed through unchanged in respect to those portions which are in excess.

Following the formation of the aluminum fluoride and metal chloride the residue is then leached with water to remove the water soluble metal chloride. This operation may conveniently take place in a digester, thickener or other apparatus familiar to those skilled in the art. The aluminum fluoride may be left as a residue which can be recovered from a continuous extraction tank such as a Dorr thickener, or the aluminum fluoride may be removed by filtration or centrifugation.

The separated aluminum fluoride is then dried in a conventional manner and is then ready for introduction to the Hall-Heroult aluminum cell, or it may be used for other purposes.

The best mode of practicing my invention may be readily understood by a consideration of the following examples:

Example 1

To a mixture of 166 parts of calcium fluoride and 78 parts of kaolin (essentially $Al_2O_3 \cdot 2SiO_2 \cdot 2H_2O$), 51 parts of carbon were added, and the combined mixture was placed in a graphite reactor. The reactor was equipped with an inlet section for the introduction of chlorine and for a vapor removal system to conduct the reaction gases to a recovery system. The graphite reactor was heated externally until the reactants reached a temperature of about 600° C. A stream of nitrogen was introduced to facilitate the removal of the water released by the high temperature although air would be equally satisfactory for this purpose. After the combined water was removed, the temperature was allowed to drop to 300° C., at which time the introduction of chlorine was started. Simultaneously with the introduction of chlorine the temperature of the reaction mass was raised to about 700° C. At this temperature white solids appeared in the water recovery system, indicating the evolution and absorption of silicon tetrafluoride. After an hour, the chlorine flow was terminated, and the temperature gradually reduced. The excess chlorine was removed from the system by the introduction of nitrogen. X-ray analysis of the residue remaining in the reaction vessel showed that it consisted of calcium chloride, aluminum fluoride and possibly CaFCl. Spectrographic analysis of this same residue indicated the $SiO_2$ content was about 0.01%. A chemical analysis of the residue for $SiO_2$ showed a value of 0.07%.

The residue from the above reaction was then leached with water to remove water soluble materials. The resulting aqueous solution from the water leaching operation was evaporated to dryness to yield a solid material. A small portion of this solid when dissolved in distilled water gave a white precipitate with silver nitrate indicating the presence of chloride ion. X-ray analysis of this water soluble material indicated that it was $CaCl_2 \cdot 2H_2O$. The insoluble portion from the water extraction was dried, and X-ray analysis showed that it was aluminum fluoride with a small amount of calcium present as calcium fluoride.

Example 2

A powdered mixture of 174 parts of calcium fluoride, 82 parts of kaolin and 54 parts of carbon were intimately mixed and placed in a graphite reactor. The kaolin was first dehydrated by the introduction of nitrogen at high temperature after which chlorine was introduced until the reaction was completed. The methods of control were the same as those used in Example 1. The X-ray pattern of the residue in the dry reaction mass gave evidence of aluminum fluoride and calcium chloride. The spectrographic analysis of this residue indicated that the major constituent was calcium. Chemical analysis of this residue showed that the silica content was about 0.10%, indicating the effectiveness of the separation of the silicon from the aluminum.

*Example 3*

A powder mixture consisting of 178 parts of sodium fluoride, 78 parts of kaolin (essentially $Al_2O_3 \cdot 2SiO_2 \cdot 2H_2O$), and 51 parts of carbon is placed in a graphite reactor. The kaolin is first dehydrated by the introduction of nitrogen at a temperature of 500° C., after which the chlorine is introduced and the reaction occurs at about 700° C. While the reaction is occurring, silicon tetrafluoride and a mixture of carbon monoxide and carbon dioxide evolves, leaving a residue of aluminum fluoride and sodium chloride. Water leaching of this residue removes the water soluble sodium chloride, leaving the insoluble aluminum fluoride.

I claim:

1. The process for the separation of aluminum from silicon as they occur in a high silica aluminum ore containing aluminum silicate and selected from the group consisting of bauxite, clay and kyanite comprising reacting the said ore while in a finely-divided state and in anhydrous condition with a fluoride of a metal selected from the group consisting of alkali metal fluorides and alkaline earth metal fluorides and which metal forms a water soluble chloride, a reducing agent and chlorine, the said reactants being brought together simultaneously and in intimate mixture while maintaining a reaction temperature of at least 600° C. until substantially all of the silicon has been released as silicon tetrafluoride.

2. The process of claim 1 in which the said ore is first calcined to remove any water present.

3. The process of claim 2 in which the calcining of the said ore is conducted in the presence of an inert gas at a temperature between 350 to 950° C. to remove any water present.

4. The process of claim 1 in which the reaction temperature is maintained between 600 and 950° C.

5. The process of claim 1 in which the reducing agent is carbon.

6. The process of claim 1 in which the chlorine is present in an amount in excess of that necessary to convert all of the metal of the metal fluoride to the chloride.

7. The process for the separation of aluminum from silicon as they occur in high silica aluminum ore containing aluminum silicate and selected from the group consisting of bauxite, clay and kyanite comprising reacting the said ore while in a finely-divided state and in anhydrous condition with a fluoride of a metal selected from the group consisting of alkali metal fluorides and alkaline earth metal fluorides and which metal forms a water soluble chloride, a reducing agent and chlorine, the said reactants being brought together simultaneously and in intimate mixture while maintaining a reaction temperature of at least 600° C. until substantially all of the silicon has been released as silicon tetrafluoride gas leaving a solid residue and thereafter extracting the said residue with water to remove water-soluble metal chloride.

References Cited in the file of this patent

UNITED STATES PATENTS

| | | |
|---|---|---|
| 282,621 | Frishmuth | Aug. 7, 1883 |
| 282,622 | Frishmuth | Aug. 7, 1883 |
| 1,392,044 | Booth | Sept. 27, 1921 |